(12) United States Patent
Wang et al.

(10) Patent No.: US 8,132,869 B2
(45) Date of Patent: Mar. 13, 2012

(54) FASTENING DEVICE AND A COMPUTER CASE HAVING THE FASTENING DEVICE

(75) Inventors: Hsin-Hsiung Wang, Taipei Hsien (TW); Chun Chang, Taipei Hsien (TW)

(73) Assignee: Aopen Inc. (TW)

( * ) Notice: Subject to any disclaimer, the term of this patent is extended or adjusted under 35 U.S.C. 154(b) by 167 days.

(21) Appl. No.: 12/550,352

(22) Filed: Aug. 29, 2009

(65) Prior Publication Data

US 2010/0052485 A1    Mar. 4, 2010

(30) Foreign Application Priority Data

Sep. 2, 2008  (TW) .............................. 97215787 U

(51) Int. Cl.
*A47B 81/00* (2006.01)

(52) U.S. Cl. .............. 312/223.2; 312/319.1; 361/679.33

(58) Field of Classification Search .................. 403/362, 403/408.1; 361/679.33–679.39, 829; 312/223.2, 312/223.1, 319.1, 216, 215; 292/1, 259 R, 292/262, DIG. 11, DIG. 53, DIG. 54, DIG. 64
See application file for complete search history.

(56) References Cited

U.S. PATENT DOCUMENTS

| | | | | |
|---|---|---|---|---|
| 4,979,909 A | * | 12/1990 | Andrews ........................ | 439/352 |
| 5,587,889 A | * | 12/1996 | Sacherman ................... | 361/809 |
| 6,256,204 B1 | * | 7/2001 | Wormsbecher et al. ...... | 361/727 |
| 6,275,377 B1 | * | 8/2001 | Liu et al. ................... | 361/679.31 |
| 6,297,952 B1 | * | 10/2001 | Liu et al. ................... | 361/679.31 |
| 6,370,022 B1 | * | 4/2002 | Hooper et al. ............ | 361/679.33 |
| 6,473,313 B1 | * | 10/2002 | Chen et al. ................... | 361/801 |
| 6,654,240 B1 | * | 11/2003 | Tseng et al. ............. | 361/679.33 |
| 6,665,177 B2 | * | 12/2003 | Chen ........................ | 361/679.58 |
| 6,760,226 B2 | * | 7/2004 | Chen ............................. | 361/725 |
| 6,885,550 B1 | * | 4/2005 | Williams ................. | 361/679.33 |
| 7,085,131 B2 | * | 8/2006 | Peng et al. ............... | 361/679.32 |
| 7,212,411 B2 | * | 5/2007 | Williams ...................... | 361/726 |
| 7,233,490 B1 | * | 6/2007 | Lai ........................... | 361/679.33 |
| 7,384,106 B2 | * | 6/2008 | Lan .............................. | 312/223.2 |
| 7,405,950 B2 | * | 7/2008 | Zhang et al. .................. | 361/810 |
| 7,440,270 B2 | * | 10/2008 | Zheng et al. ............. | 361/679.33 |
| 7,443,667 B2 | * | 10/2008 | Guo et al. ................ | 361/679.33 |
| 7,492,585 B2 | * | 2/2009 | Zhang et al. ............. | 361/679.37 |
| 7,495,909 B1 | * | 2/2009 | Chen et al. ............... | 361/679.37 |
| 7,551,434 B2 | * | 6/2009 | Zhu et al. ................. | 361/679.33 |
| 7,580,253 B1 | * | 8/2009 | Chen et al. ............... | 361/679.33 |
| 7,823,934 B2 | * | 11/2010 | Huang et al. .................. | 292/143 |
| 7,826,209 B2 | * | 11/2010 | Chen et al. ............... | 361/679.37 |
| 7,830,654 B2 | * | 11/2010 | Hsieh et al. ............. | 361/679.33 |
| 7,841,565 B2 | * | 11/2010 | Peng et al. .................... | 248/27.1 |
| 2004/0221441 A1 | * | 11/2004 | Williams ........................ | 29/453 |
| 2006/0017355 A1 | * | 1/2006 | Lan .............................. | 312/223.2 |
| 2007/0138921 A1 | * | 6/2007 | Peng et al. ...................... | 312/9.3 |
| 2007/0145866 A1 | * | 6/2007 | Huang et al. .................. | 312/215 |
| 2009/0189042 A1 | * | 7/2009 | Chen et al. ................. | 248/309.1 |

* cited by examiner

*Primary Examiner* — Darnell Jayne
*Assistant Examiner* — Kimberley S Wright
(74) *Attorney, Agent, or Firm* — The Mueller Law Office, P.C.

(57) ABSTRACT

A fastening device is provided on a side wall of a positioning frame for fastening of an electronic device disposed in the positioning frame. The fastening device includes a limiting component and a positioning component. The limiting component includes a connecting part connected to an outer face of the side wall, and a limiting part extending from the connecting part and spaced apart from the side wall. The positioning component includes a rod body, and two positioning parts extending respectively from two ends of the rod body. Each of the positioning parts extends into a respective one of two holes in the side wall and a respective one of two blind holes in the electronic device. The rod body is limited from movement in a direction away from the side wall by the limiting part.

10 Claims, 5 Drawing Sheets

FASTENING DEVICE AND A COMPUTER CASE HAVING THE FASTENING DEVICE

CROSS-REFERENCE TO RELATED APPLICATION

This application claims priority of Taiwanese Application No. 097215787, filed on Sep. 2, 2008.

BACKGROUND OF THE INVENTION

1. Field of the Invention

The present invention relates to a fastening device, more particularly to a fastening device with a stable structure and that facilitates replacement.

2. Description of the Related Art

Generally, desktop personal computers have data storage devices, such as a hard drive, an optical disc drive, etc. When it is intended to assemble a data storage device to a computer case, it is typical to dispose the data storage device in a positioning frame in the computer case, followed by fastening the data storage device to the positioning frame using screws. Thus, it takes a relatively long time to assemble and disassemble the data storage device, and an additional tool (a screwdriver, for example) is needed during assemble and disassemble.

Therefore, a screw-less fastener has been proposed heretofore. Aside from dispensing with the need to use screws, assembly and disassembly are made more convenient.

Referring to FIG. 1, Taiwanese patent No. 577576 discloses a screw-less fastener 11 provided on a side wall of a positioning frame 12 for fastening of an optical disc drive 13 disposed in the positioning frame 12. One end of the screw-less fastener 11 is a hinge part 111 hinged on the side wall of the positioning frame 12. The other end of the screw-less fastener 11 is a protruding stick 112.

When assembling the optical disc drive 13, the optical disc drive 13 is disposed in the positioning frame 12, and a blind hole 131 in the optical disc drive 13 is aligned with a hole 121 in the side wall of the positioning frame 12. The screw-less fastener 11 is then rotated to enable the protruding stick 112 to extend through the hole 121 and into the blind hole 131.

Because the above-mentioned hinge part 111 is riveted on the side wall of the positioning frame 12, it is not easy to replace the hinge part 111 when broken. Moreover, when the protruding stick 112 is extended into the blind hole 131, it only provides a positioning function for limiting the optical disc drive 13 from movement along a direction of disassembly/assembly, and does not provide a clamping force to the optical disc drive 13. Thus, the conventional screw-less fastener 11 still has room for improvement.

SUMMARY OF THE INVENTION

Therefore, an object of the present invention is to provide a fastening device with a stable structure and that facilitates replacement.

Another object of the present invention is to provide a computer case including a fastening device with a stable structure and that facilitates replacement.

Accordingly, the fastening device of the present invention is to be provided on a sidewall of a positioning frame for fastening of an electronic device disposed in the positioning frame. The electronic device has a side face formed with two blind holes spaced apart from each other. The side wall of the positioning frame has an outer face and is formed with two holes disposed at positions respectively corresponding to the two blind holes. The fastening device comprises a limiting component and a positioning component.

The limiting component is to be disposed between the two holes and includes a connecting part to be connected to the outer face of the side wall of the positioning frame, and a limiting part extending from the connecting part and to be spaced apart from the side wall of the positioning frame.

The positioning component includes a rod body, and two positioning parts extending respectively from two ends of the rod body. Each of the positioning parts is adapted to be extended from the outer face of the side wall of the positioning frame into a respective one of the two holes and a respective one of the two blind holes. The rod body is limited from movement in a direction away from the side wall of the positioning frame by the limiting part of the limiting component.

Preferably, the fastening device further comprises a pull component connected to the rod body of the positioning component and disposed at a position that is staggered with a position of the limiting component.

Preferably, the limiting component is in a form of a hook with an opening, and is to be disposed at a location that is offset in a direction toward the opening from an imaginary line interconnecting the two blind holes.

Preferably, the limiting component is to be disposed closer to one of the two holes compared to the pull component, and the pull component connected to the rod body of the positioning component is to be disposed closer to the other one of the two holes compared to the limiting component.

Preferably, the limiting part of the limiting component has a free end distal from the connecting part, and the limiting component further includes a guiding part extending outwardly and obliquely from the free end of the limiting part.

Preferably, the positioning component is formed integrally by bending a metal wire section.

Preferably, the limiting component is formed integrally by cutting the side wall of the positioning frame, followed by bending a cut section of the side wall.

Preferably, the pull component is in a shape of a thin plate.

The computer case having a fastening device of the present invention comprises at least one positioning frame and at least one fastening device. Since the assembling relationship between the fastening device and the positioning frame has been described in the foregoing paragraphs, it will not be repeated herein.

By extending each of the positioning parts of the positioning component from the outer face of the side wall of the positioning frame into the respective one of the two holes and the respective one of the two blind holes of the electronic device, and by virtue of the limiting part that limits the rod body of the positioning component from movement in a direction away from the sidewall of the positioning frame, the present invention is able to fasten the electronic device stably with a simple structure. Additionally, the positioning component has an advantage of ease of replacement.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
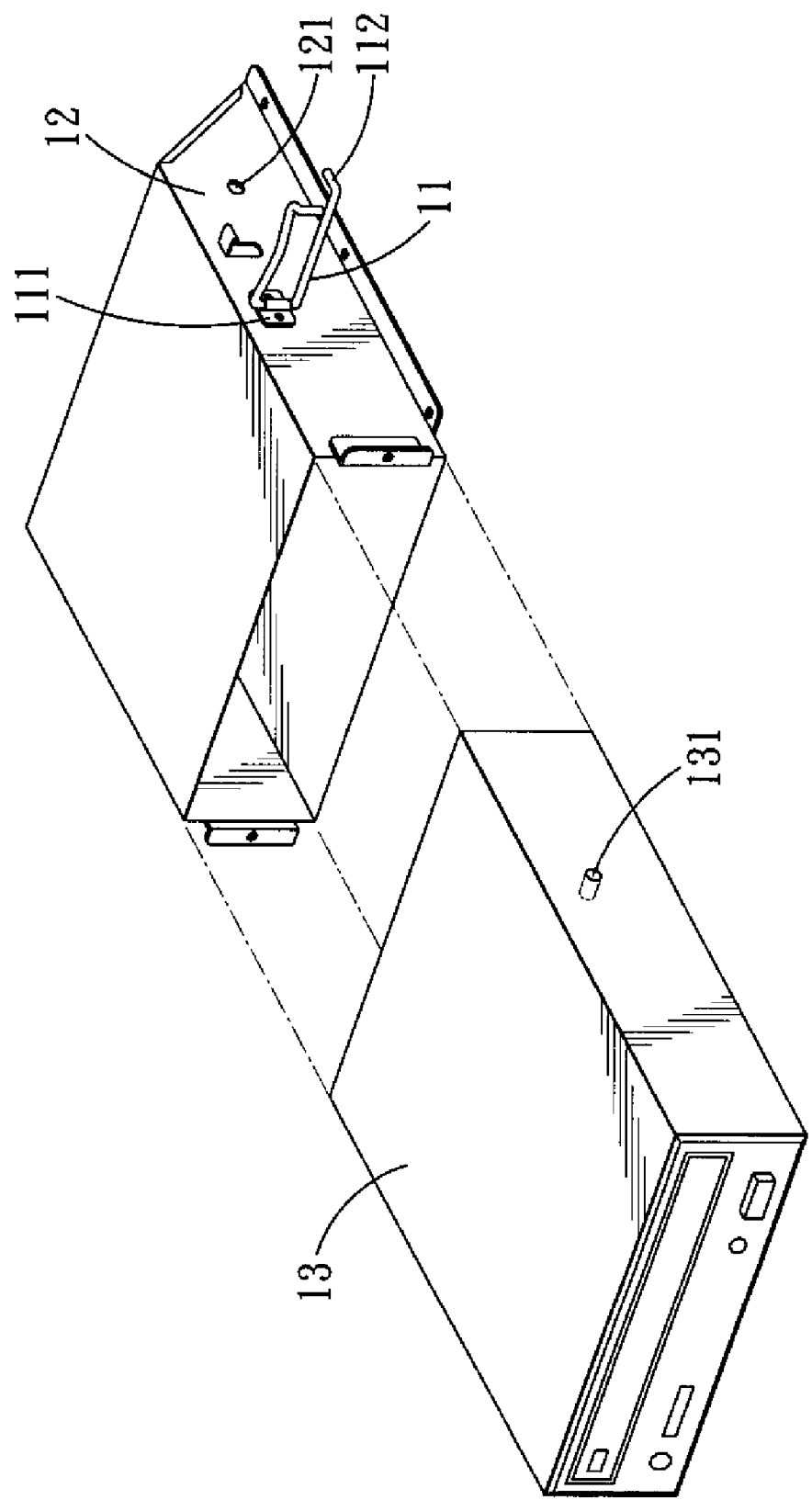
FIG. 1 is an exploded perspective view showing a conventional screw-less fastener.
Figure 2:
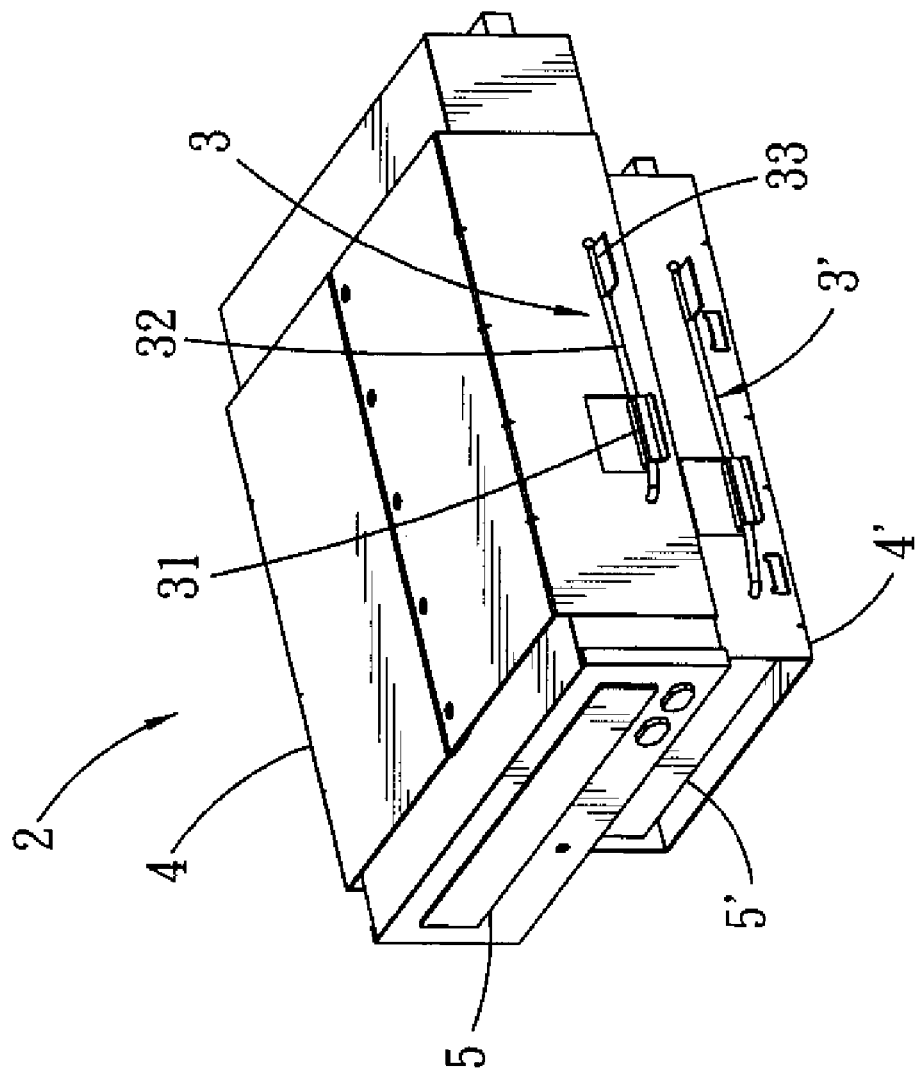
FIG. 2 is a perspective view showing a preferred embodiment of a fastening device according to the present invention.
Figure 3:
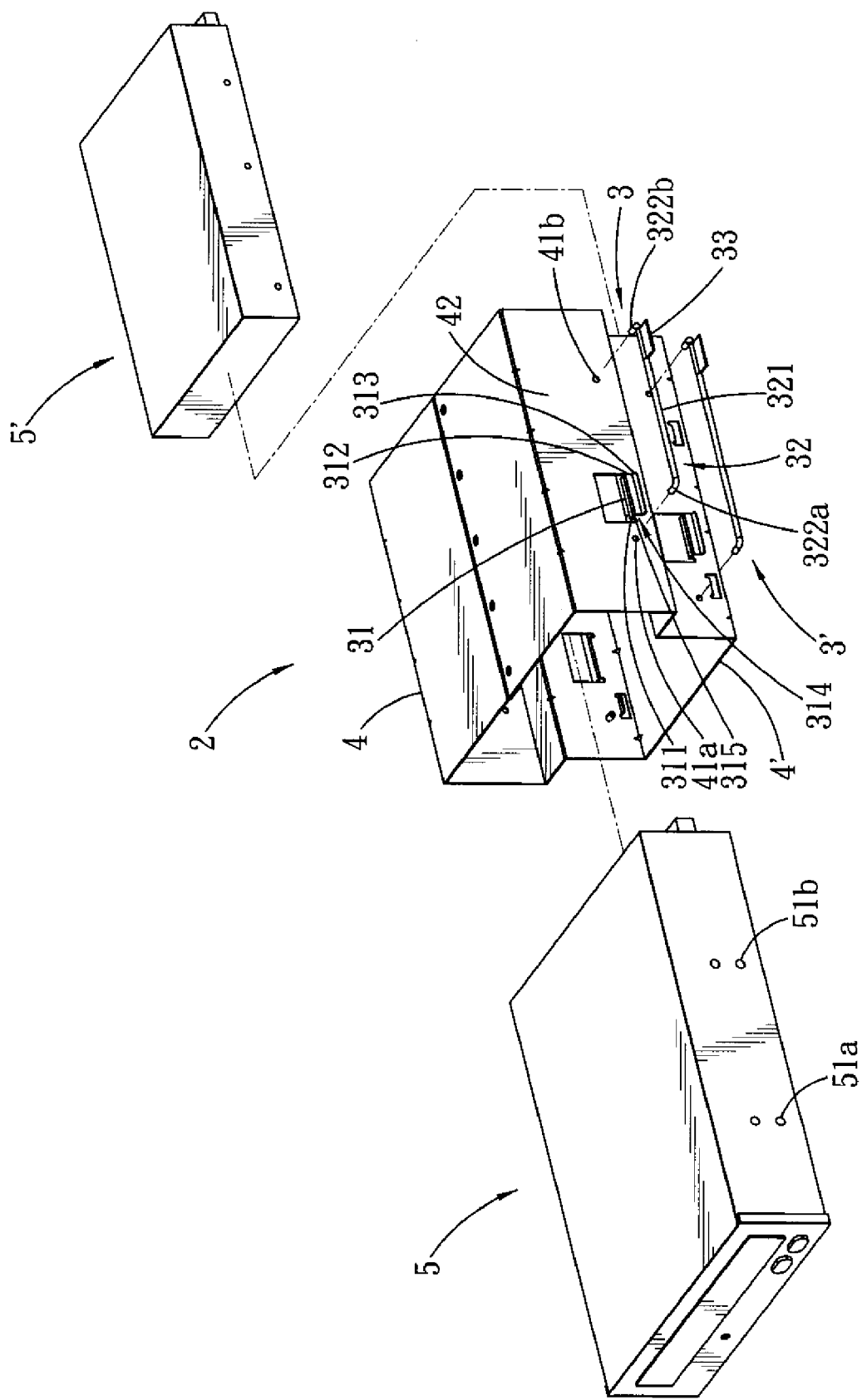
FIG. 3 is an exploded perspective view of the preferred embodiment.

Referring to FIGS. 2 and 3, a preferred embodiment of a computer case 2 having fastening devices according to the present invention includes two positioning frames 4, 4' connected to each other with one on top of the other. An electronic device 5 is disposed in the positioning frame 4, and an electronic device 5' is disposed in the positioning frame 4'. The computer case 2 further includes a fastening device 3 provided on the positioning frame 4 for fastening of the electronic device 5, and a fastening device 3' provided on the positioning frame 4' for fastening of the electronic device 5'.

Since the assembling relationship among the fastening device 3', the positioning frame 4' and the electronic device 5', and an assembling relationship among the fastening device 3, the positioning frame 4 and the electronic device 5 are the same, only the assembling relationship among the fastening device 3, the positioning frame 4 and the electronic device 5 will be described in the following.

Referring to FIG. 3, the electronic device 5 has a side face formed with a plurality of blind holes. In this embodiment, only lower blind holes (51a), (51b) are used as an example. Moreover, to facilitate description, the blind hole (51a) is defined as the left one, and the blind hole (51b) is defined as the right one.

The positioning frame 4 has a side wall 42 formed with two holes (41a), (41b). Similarly, the hole (41a) is defined as the left one, and the hole (41b) is defined as the right one. Moreover, the hole (41a) is disposed at a position corresponding to a position of the blind hole (51a), and the hole (41b) is disposed at a position corresponding to a position of the blind hole (51b).

The fastening device 3 is provided on the side wall 42 of the positioning frame 4 for fastening of the electronic device 5. The fastening device 3 includes a limiting component 31, a positioning component 32, and a pull component 33.

Figure 5:
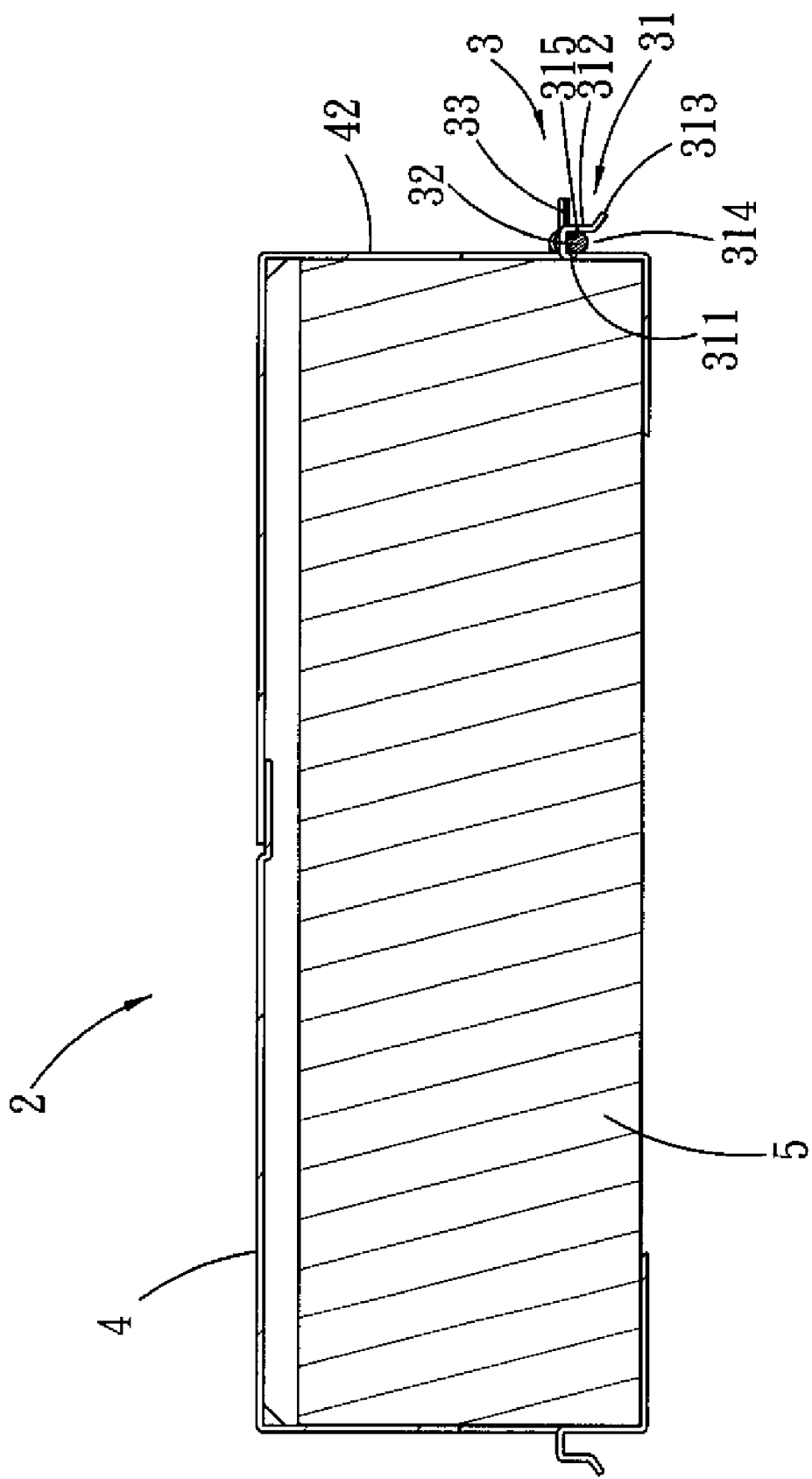
FIG. 5 is a sectional view taken along a line V-V in FIG. 4.

Referring to FIGS. 3 and 5, the limiting component 31 is disposed between the hole (41a) and the hole (41b), and is in a form of a hook with an opening 314 that opens downwardly. The limiting component 31 includes a connecting part 311 connected to an outer face of the side wall 42 of the positioning frame 4, a limiting part 312 extending from the connecting part 311 and spaced apart from the side wall 42, and a guiding part 313 extending outwardly and obliquely from a free end of the limiting part 312 that is distal from the connecting part 311. Additionally, a bottom face of a horizontal part of the connecting part 311 is defined as an abutting face 315 (i.e., a part where an upper edge of the positioning component 32 abuts against during assembly) In this embodiment, the limiting component 31 is formed integrally by cutting the sidewall 42 of the positioning frame 4, followed by bending a cut section of the side wall to form the connecting part 311, the limiting part 312 and the guiding part 313 in sequence. However, the present invention is not limited in this respect. The connecting part 311 can be connected to the side wall 42 of the positioning frame 4 by adhering, welding or locking in other embodiments of the invention.

Figure 4:
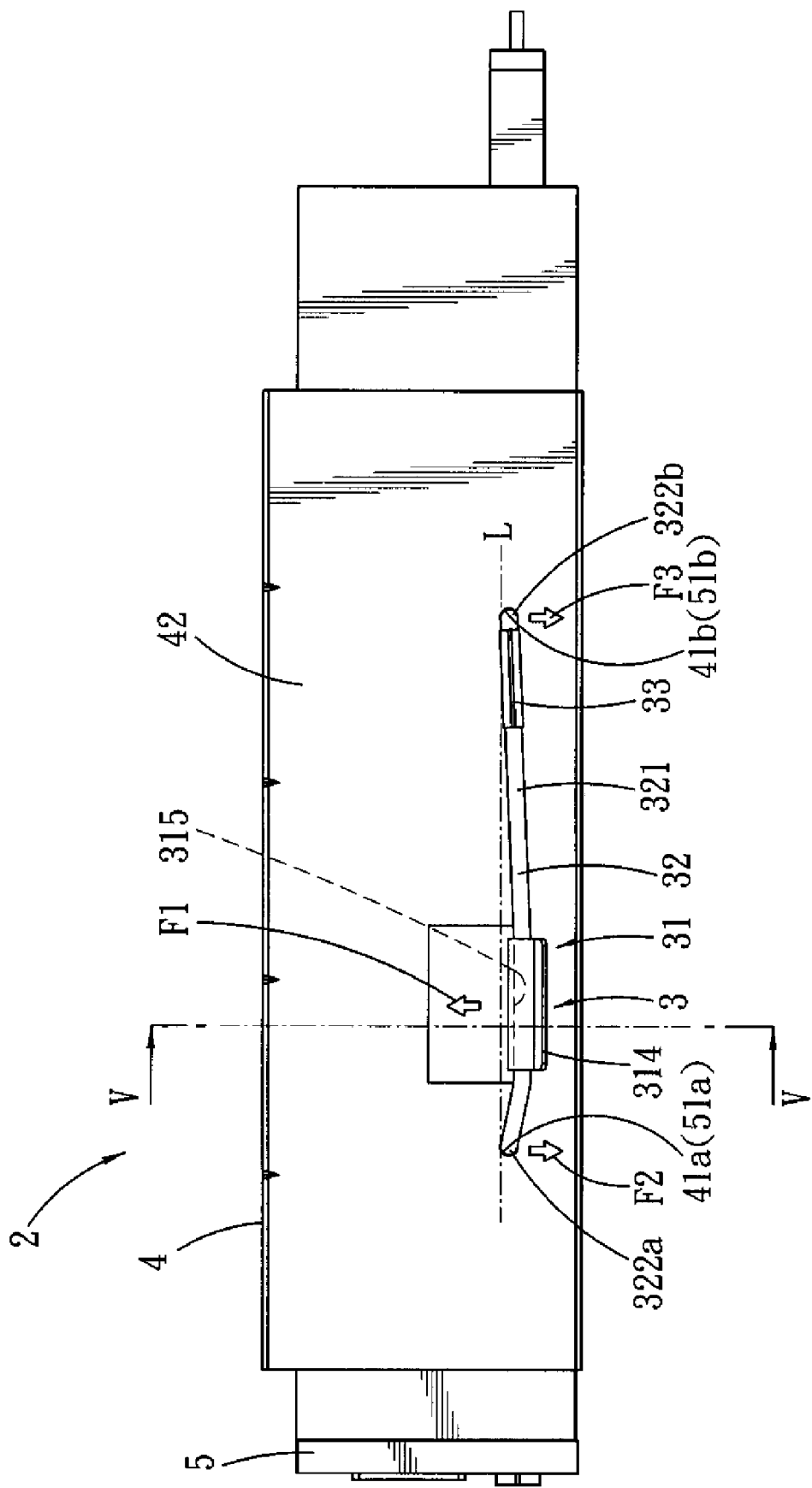
FIG. 4 is a schematic side view of the preferred embodiment.

Referring to FIG. 4, the limiting component 31 is disposed at a location that is offset in a direction toward the opening 314 (i.e., downwardly) from an imaginary line (L) interconnecting the blind hole (51a) and the blind hole (51b). That is to say, the abutting face 315 of the limiting component 31 is spaced apart from the imaginary line (L). A function of this arrangement will be described in the following paragraphs.

Referring to FIGS. 2 and 3, the positioning component 32 includes a rod body 321, and two positioning parts (322a), (322b) extending respectively from two ends of the rod body 321, wherein the positioning part (322a) is defined as the left one, and the positioning part (322b) is defined as the right one. In this embodiment, the positioning component 32 is formed integrally by bending a metal wire section to form the positioning part (322a), the rod body 321 and the positioning part (322b) in sequence. The positioning part (322a) is generally perpendicular to the rod body 321, and the positioning part (322b) is generally perpendicular to the rod body 321 as well.

The pull component 33 is connected to the rod body 321 of the positioning component 32. When the positioning component 32 is assembled on the positioning frame 4, the pull component 33 is disposed at a position that is staggered with a position of the limiting component 31. In this embodiment, the pull component 33 is in a shape of a thin plate that is fastened to the rod body 321 via surrounding the rod body 321 and adhering an upper end of the thin plate to a lower end of the thin plate.

Referring to FIGS. 3 and 4, when assembling the electronic device 5 to the positioning frame 4, the electronic device 5 is first placed into the positioning frame 4 such that the blind hole (51a) exactly corresponds in position to the hole (41a), and the blind hole (51b) exactly corresponds in position to the hole (41b).

Subsequently, the positioning part (322a) of the positioning component 32 is extended from the outer face of the side wall 42 into the corresponding hole (41a) and the corresponding blind hole (51a). At this time, the rod body 321 is oblique, a left section of the rod body 321 is higher than a right section of the rod body 321, and the rod body 321 has yet to be inserted into the limiting component 31.

Subsequently, the right section of the rod body 321 is rotated upward using the pull component 33 for pulling the rod body 321 such that the rod body 321 is guided into the limiting component 31 by the guiding part 313. At this time, the rod body 321 is limited from movement in a direction away from the side wall 42 by the limiting part 312 of the limiting component 31. Since the abutting face 315 of the limiting component 31 is spaced apart from the imaginary line (L) interconnecting the blind hole (51a) and the blind hole (51b), continued pulling of the rod body 321 using the pull component 33 results in elastic deformation of the rod body 321 at the limiting component 31 such that the rod body 321 presents a curved shape thereat.

Finally, the rod body 321 is continuously pulled using the pull component 33 until the positioning part (322b) of the positioning component 32 is extended from the outer face of the side wall 42 into the corresponding hole (41b) and the corresponding blind hole (51b) to complete the assembly.

It is particularly noted that, in this embodiment, the limiting component 31 is disposed closer to the hole (41a) compared to the pull component 33, and the pull component 33 connected to the rod body 321 is disposed closer to the hole (41b) compared to the limiting component 31. Accordingly, there is a relatively long distance between the pull component 33 and the limiting component 31 that makes it relatively easier to pull the rod body 321 using the pull component 33 for elastic deformation of the rod body 321 at the limiting component 31.

Referring to FIG. 4, due to a distance between the abutting face 315 of the limiting component 31 and the imaginary line (L) interconnecting the blind hole (51a) and the blind hole (51b), the positioning component 32 presents a curved shape when it is disposed on the positioning frame 4. The rod body 321 of the positioning component 32 provides an upward force (F1) applied to the limiting component 31. The positioning part (322a) of the positioning component 32 provides a downward force (F2) applied to the blind hole (52a), and the positioning part (322b) of the positioning component 32 provides a downward force (F3) applied to the blind hole (52b). The downward forces (F2), (F3) cooperate with an upward supporting force provided by the positioning frame 4 so as to achieve a clamping effect for the electronic device 5, such that the electronic device 5 is fastened securely and is not loosened due to vibration. It is noted that the forces (F1), (F2), (F3) are provided only when the distance between the abutting face 315 of the limiting component 31 and the imaginary line (L) is larger than zero.

The amounts of the downward forces (F2), (F3) are influenced by a material characteristic of the positioning component 32, and the distance between the abutting face 315 of the limiting component 31 and the imaginary line (L) interconnecting the blind hole (51a) and the blind hole (51b). Thus, these two parameters can be adjusted during a design stage to obtain the required downward forces (F2), (F3).

In sum, by extending each of the positioning parts (332a), (332b) of the positioning component 32 from the outer face of the side wall 42 of the positioning frame 4 into the respective one of the two holes (41a), (41b) and the respective one of the two blind holes (51a), (51b) of the electronic device 5, and by virtue of the limiting part 312 that limits the rod body 321 of the positioning component 32 from movement in a direction away from the side wall 42 of the positioning frame 4, the present invention is able to fasten the electronic device 5 stably with a simple structure. Additionally, the positioning component 32 has an advantage of ease of replacement.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A fastening device adapted to be provided on a side wall of a positioning frame for fastening of an electronic device disposed in the positioning frame, the electronic device having a side face formed with two blind holes spaced apart from each other, the side wall of the positioning frame having an outer face and being formed with two holes disposed at positions respectively corresponding to the two blind holes, said fastening device comprising:

a limiting component to be disposed between the two holes and including a connecting part to be connected to the outer face of the side wall of the positioning frame, and a limiting part extending from said connecting part and to be spaced apart from the side wall of the positioning frame, said limiting component being in a form of a hook with an opening and to be disposed at a location that is offset in a direction toward said opening from an imaginary line interconnecting the two blind holes;

a positioning component including an elongated rod body having two ends, and two positioning parts extending respectively from said two ends of said rod body, each of said positioning parts being adapted to be extended from the outer face of the side wall of the positioning frame into a respective one of the two holes and a respective one of the two blind holes, said rod body being limited from movement in a direction away from the side wall of the positioning frame by said limiting part of said limiting component; and a pull component connected to said rod body of said positioning component and disposed at a position that is staggered with a position of said limiting component, said pull component is in a shape of a thin plate that has an upper end and a lower end and that is fastened to said rod body via surrounding said rod body and adhering said upper end to said lower end;

wherein, by virtue of the offset arrangement between said limiting component and said blind holes, said positioning component presents a curved shape when said positioning component is disposed on said positioning frame due to a distance between said limiting component and the imaginary line, so that said rod body provides an upward force applied to said limiting component and said positioning parts of said positioning component provide downward forces applied to said blind holes, the downward forces cooperating with an upward supporting force provided by said positioning frame so as to achieve a clamping effect for securely fastening the electronic device.

2. The fastening device as claimed in claim 1, wherein said limiting component is to be disposed closer to one of the two holes compared to said pull component, and said pull component connected to said rod body of said positioning component is to be disposed closer to the other one of the two holes compared to said limiting component.

3. The fastening device as claimed in claim 2, wherein said limiting part of said limiting component has a free end distal from said connecting part, and said limiting component further includes a guiding part extending outwardly and obliquely from said free end of said limiting part.

4. The fastening device as claimed in claim 1, wherein said positioning component is formed integrally by bending a metal wire section.

5. The fastening device as claimed in claim 1, wherein said limiting component is formed integrally by cutting the side wall of the positioning frame, followed by bending a cut section of the side wall.

6. A computer case having a fastening device, comprising:

a positioning frame adapted for accommodating an electronic device that has a side face formed with two blind holes spaced apart from each other, said positioning frame having a side wall, said side wall of said positioning frame having an outer face and being formed with two holes disposed at positions respectively corresponding to the two blind holes; and a fastening device provided on said side wall of said positioning frame for fastening of the electronic device, said fastening device including a limiting component disposed between said two holes and including a connecting part connected to said outer face of said side wall of said positioning frame, and a limiting part extending from said connecting part and spaced apart from said side wall of said positioning frame, said limiting component being in a form of a hook with an opening and to be disposed at a location that is offset in a direction toward said opening from an imaginary line interconnecting the two blind holes, a positioning component including an elongated rod body having two ends, and two positioning parts extending respectively from said two ends of said rod body, each of said positioning parts extending from said outer face of said side wall of said positioning frame into a respective one of said two holes and a respective one of the two blind holes, said rod body being limited from movement in a direction away from said side wall of said positioning frame by said limiting part of said limiting component; and a pull component connected to said rod body of said positioning component and disposed at a position that is staggered with a position of said limiting component, said pull component is in a shape of a thin plate that has an upper end and a lower end and that is fastened to said rod body via surrounding said rod body and adhering said upper end to said lower end;

wherein, by virtue of the offset arrangement between said limiting component and said blind holes, said positioning component presents a curved shape when said positioning component is disposed on said positioning frame due to a distance between said limiting component and the imaginary line, so that said rod body provides an upward force applied to said limiting component and said positioning parts of said positioning component provide downward forces applied to said blind holes, the downward forces cooperating with an upward supporting force provided by said positioning frame so as to achieve a clamping effect for securely fastening the electronic device.

7. The computer case as claimed in claim 6, wherein said limiting component is disposed closer to one of said two holes compared to said pull component, and said pull component connected to said rod body of said positioning component is disposed closer to the other one of said two holes compared to said limiting component.

8. The computer case as claimed in claim 7, wherein said limiting part of said limiting component has a free end distal from said connecting part, and said limiting component further includes a guiding part extending outwardly and obliquely from said free end of said limiting part.

9. The computer case as claimed in claim 6, wherein said positioning component is formed integrally by bending a metal wire section.

10. The computer case as claimed in claim 6, wherein said limiting component is formed integrally by cutting said side wall of said positioning frame, followed by bending a cut section of said side wall.

* * * * *